United States Patent [19]
Stefanka

[11] 3,914,101
[45] Oct. 21, 1975

[54] APPARATUS FOR FORMING CORRUGATED TUBING

[75] Inventor: Joseph Anthony Stefanka, North Baltimore, Ohio

[73] Assignee: Norbalt Rubber Corporation, North Baltimore, Ohio

[22] Filed: June 3, 1974

[21] Appl. No.: 475,600

Related U.S. Application Data
[62] Division of Ser. No. 192,439, Oct. 26, 1971, Pat. No. 3,833,699.

[52] U.S. Cl............ 425/387 R; 425/392; 425/393; 425/450.9; 425/DIG. 44; 264/94
[51] Int. Cl.².................................. B29C 17/07
[58] Field of Search........ 425/387 R, 389, 393, 392, 425/403, 450 C, 183, DIG. 44, DIG. 30; 264/94, 293, 314

[56] References Cited
UNITED STATES PATENTS

| | | | |
|---|---|---|---|
| 1,358,289 | 11/1920 | Cegal................................. | 425/387 |
| 1,884,590 | 10/1932 | Davies......................... | 425/DIG. 30 |
| 2,616,129 | 11/1952 | Burton et al..................... | 425/387 X |
| 3,194,705 | 7/1965 | Caplan............................ | 425/393 X |
| 3,258,384 | 6/1966 | Scott............................ | 425/DIG. 44 |
| 3,290,728 | 12/1966 | Pratt............................... | 425/393 X |
| 3,371,381 | 3/1968 | Louth............................... | 425/387 |
| 3,743,457 | 7/1973 | Cini................................... | 425/110 |

*Primary Examiner*—Robert L. Spicer, Jr.
*Attorney, Agent, or Firm*—McNenny, Farrington, Pearne & Gordon

[57] ABSTRACT

A method and apparatus for forming corrugated tubing is disclosed. The corrugated tubing is formed from a cylindrical uncured tube of plastically deformable material. Such tube is inflated in a separable mold to an intermediate shape in which shallow extended corrugations are provided. The intermediate tube is subsequently placed on a curing mandrel in the final shape required and is cured. The apparatus for forming the intermediate tube includes separable mold halves each consisting of a plurality of separate corrugation forming sections and two end forming sections. The initial tube is positioned over an inflatable mandrel having spaced elastic sleeves and is enclosed within the mold halves. The sleeves extend to deform the ends of the initial tube and form a seal therewith. Subsequently, air under pressure is admitted to the interior of the tube to complete its inflation. The number of corrugations formed in the tube can be changed by removing or inserting corrugation forming sections in the active portion of the mold halves. Similarly, the type of end formed on the tube can be changed by changing the end forming sections in the mold halves.

19 Claims, 9 Drawing Figures

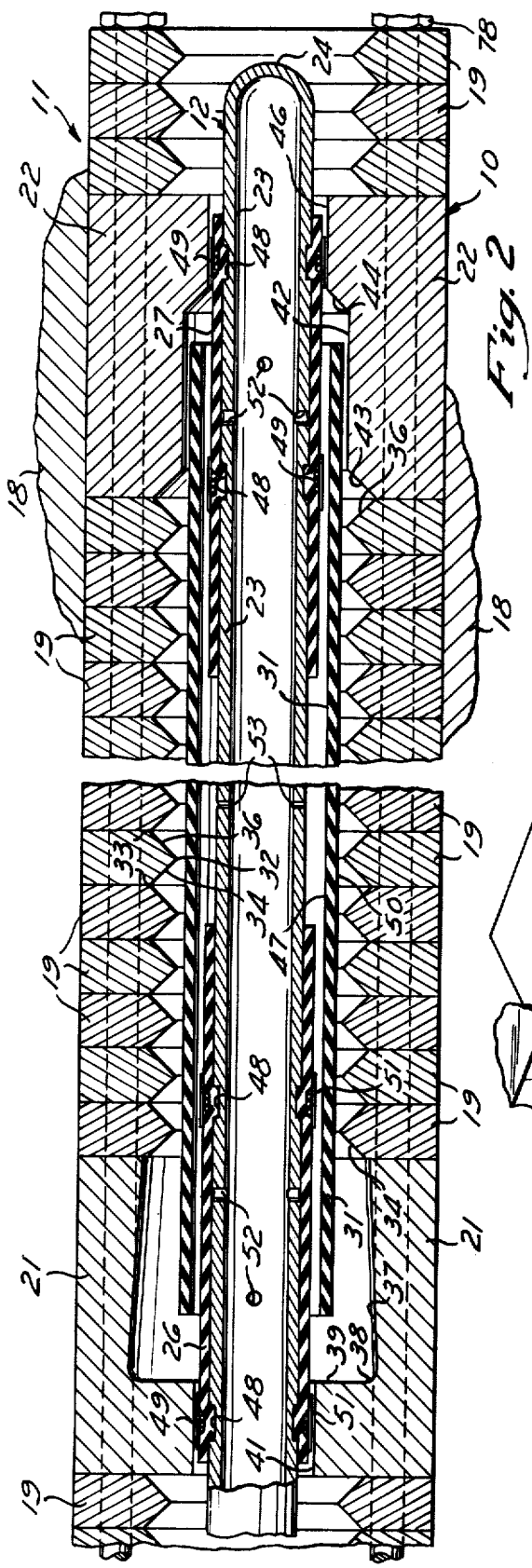

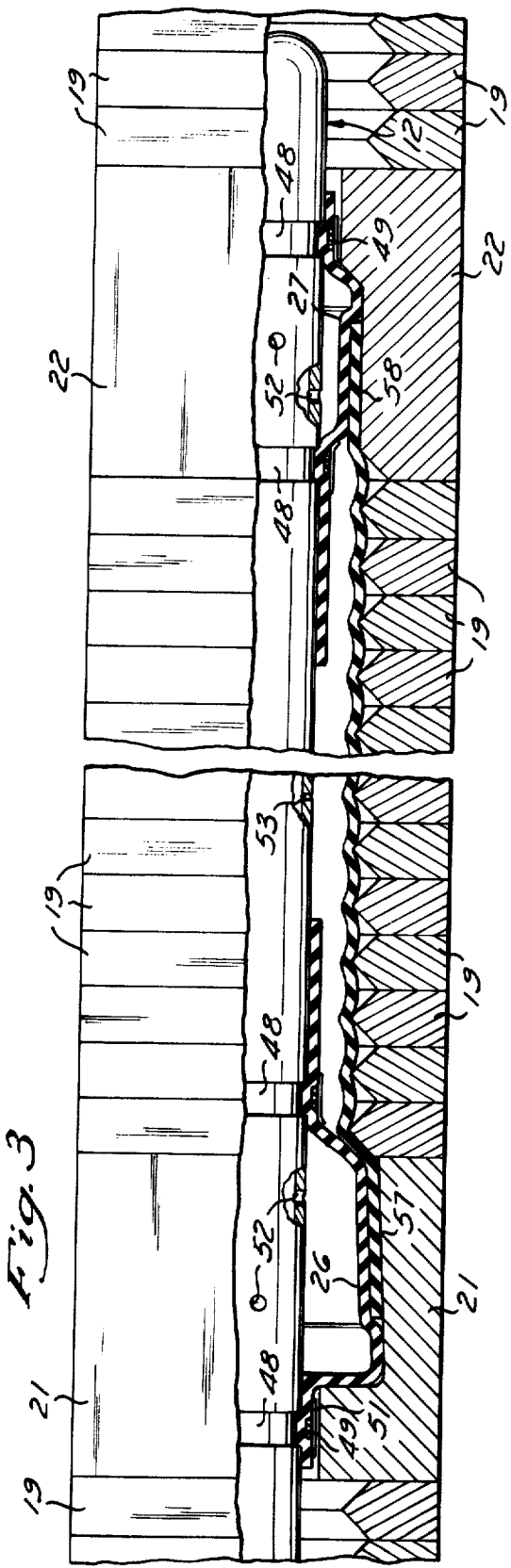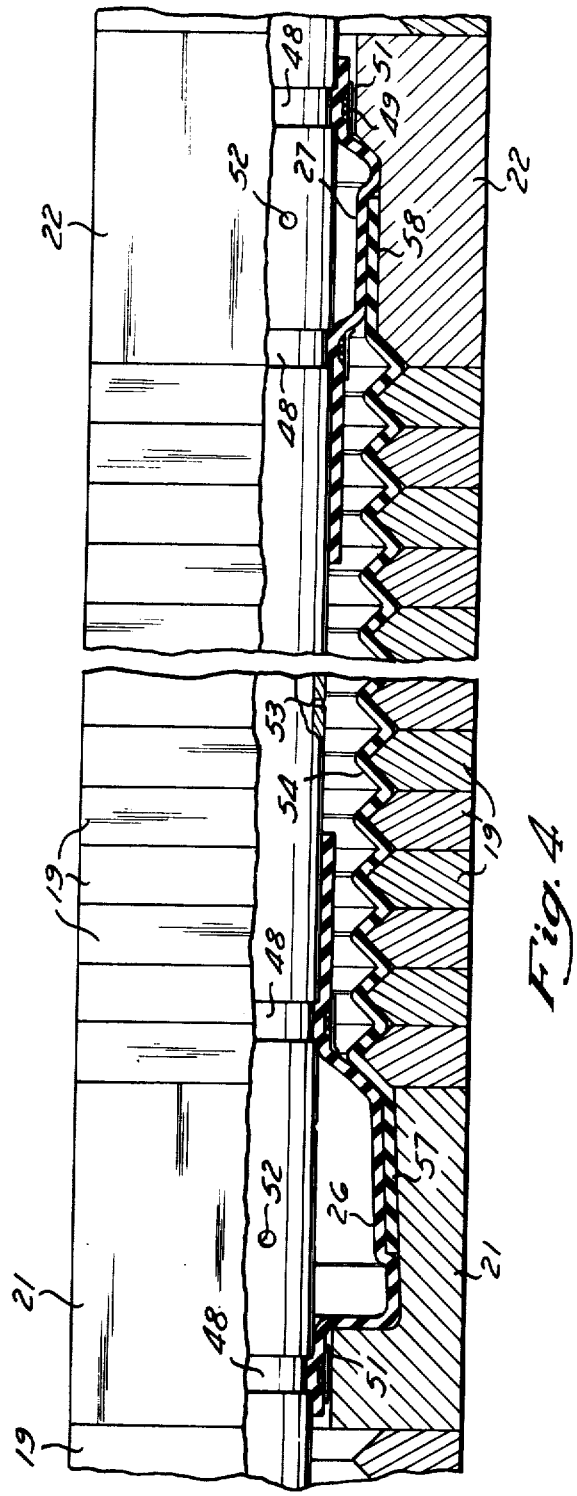

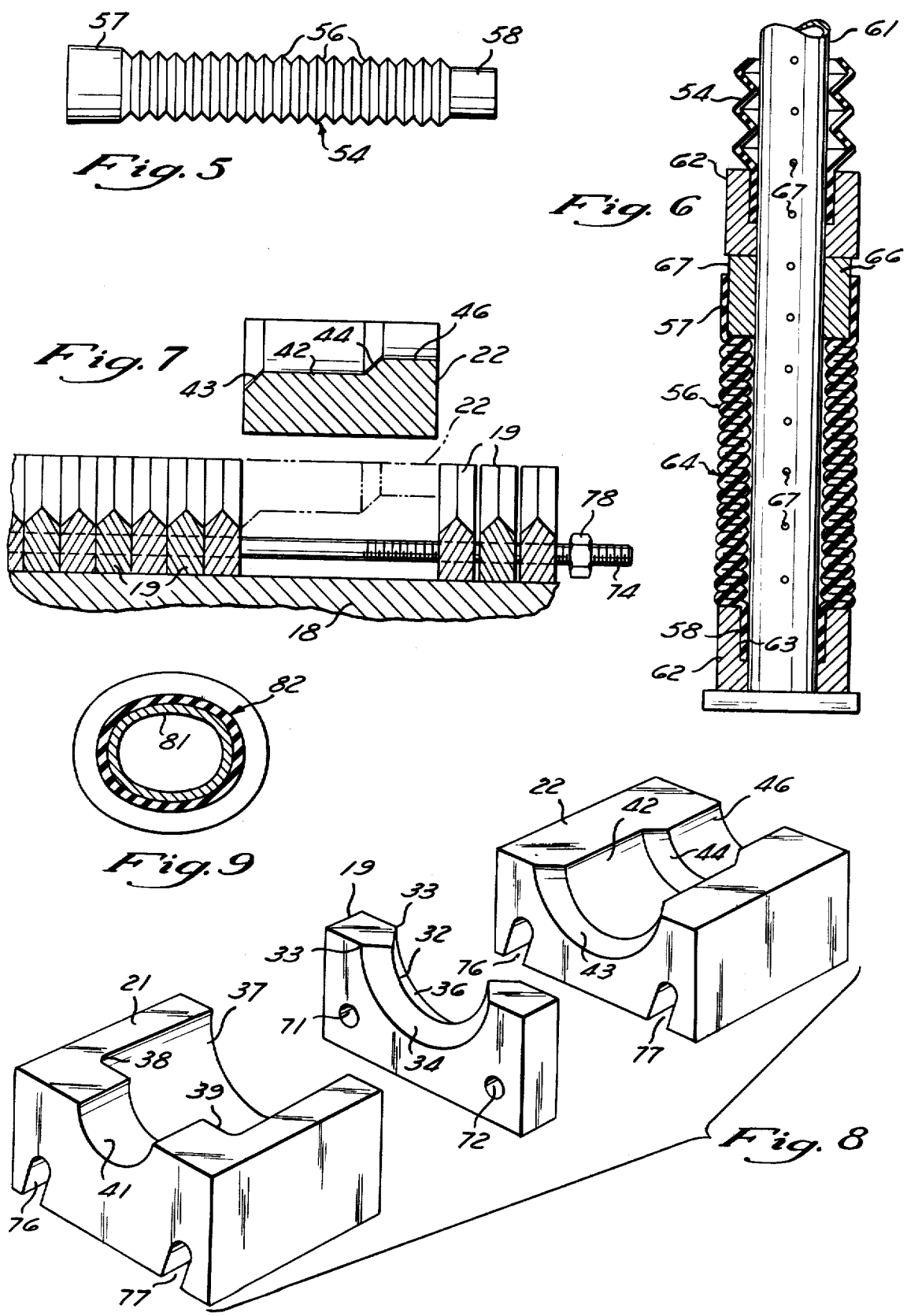

3,914,101

APPARATUS FOR FORMING CORRUGATED TUBING

This is a division of application Ser. No. 192,439, filed Oct. 26, 1971, now U.S. Pat. No. 3,833,699.

BACKGROUND OF THE INVENTION

This invention relates generally to corrugated tubing and more particularly to a novel and improved method and apparatus for manufacturing the same.

PRIOR ART

Various types of corrugated tubing are known. In some instances, such tubing has been manufactured with annular corrugations and in other instances, the corrugations are helical in configuration. The U.S. Pat. Nos. 2,299,520; 3,076,737; and 2,371,991 illustrate a method of forming tubes with annular corrugations and the U.S. Pat. Nos. 2,891,581; 3,168,604; and 3,304,581 illustrate methods of forming tubes with helical corrugations.

In my copending application, Ser. No. 65,368, filed Aug. 20, 1970, I disclose an improved method and apparatus for forming corrugated tubing. In the illustrated embodiment of such application, a cylindrical tube of uncured rubber is positioned in a separable mold formed with extended annular corrugations. The tube is pressurized while in the mold and plastically deformed without curing to an intermediate shape in which the tube is provided with shallow extended annular corrugations. Because the die can be opened, the intermediate tube can be withdrawn without substantial deformation or distortion. Subsequently, the intermediate tube is positioned on the support mandrel and axially shortened until the walls of the corrugations are substantially radial. The material is then cured while on the support.

The embodiment of such application results in an improved product, reduces the costs of tooling and labor, and eliminates substantially all scrap. However, in the illustrated embodiment of my prior application, the ends of the finished tube are substantially equal in diameter to the diameter of the initial tube before it is deformed in the mold.

SUMMARY OF THE INVENTION

The present invention has several important aspects. In accordance with one important aspect of this invention, a method and apparatus is provided for forming corrugated tubing in which one or both ends of the tube may be substantially larger in diameter than the initial cylindrical tube. In the preferred embodiment, inflatable means are provided to press the ends of the tube against the mold wall and provide a seal with such ends. The central portion of the tube is then pressurized and plastically deformed to the mold shape thereby forming an intermediate tube. Subsequently, the intermediate tube is removed from the mold without substantial deformation and is positioned on a curing mandrel. When the tube is positioned on the curing mandrel, it is shortened to the final shape required and is cured in such final shape.

In accordance with another important aspect of this invention, a novel and improved apparatus is provided to mold the tube. Such apparatus includes a separable mold providing a mold consisting of a plurality of separate sections which can be cheaply manufactured and easily assembled to provide a mold half. This structure is arranged to permit easy changeover when the number of corrugations must be changed or when the type of tube end is changed. The improved apparatus also includes inflatable means for sealing the ends of the tube and inflating the tube within the mold.

BRIEF DESCRIPTION OF THE DRAWINGS

FIG. 1 is a perspective view of the apparatus for forming the intermediate tube illustrating the apparatus with the two mold halves separated;

FIG. 2 is an enlarged broken section illustrating the mold in the closed position and the initial tube within the mold prior to inflation;

FIG. 3 is a view similar to FIG. 2 illustrating the position of the various elements immediately after pressurization at which time the ends of the initial tube are deformed into full engagement with the mold and the two ends of the tube are sealed;

FIG. 4 is a view similar to FIGS. 2 and 3 illustrating the position reached at the completion of the inflation of the tube when the intermediate tube is completed;

FIG. 5 is a side elevation at reduced scale illustrating the intermediate tube;

FIG. 6 is a side elevation partially in longitudinal section with a tube deformed to its final shape on a curing mandrel and also illustrating a second tube on the mandrel before its length is reduced;

FIG. 7 is an enlarged fragmentary view illustrating the manner in which the end forming pieces of the mold can be removed or replaced to modify the mold;

FIG. 8 is an exploded perspective view illustrating the shape of the various mold parts; and FIG. 9 is a view illustrating the modified form of curing mandrel which may be utilized to form an oval shaped tube.

DETAILED DESCRIPTION OF THE DRAWINGS

FIG. 1 illustrates a preferred structure for forming an intermediate tube in accordance with the present invention. This structure includes a lower mold half 10, a similar upper mold half 11 and an inflation mandrel 12. In the illustrated embodiment, the mandrel 12 is mounted on a fixed support 13 and the two mold halves 10 and 11 are mounted on movable supports 14 and 16, respectively for movement from the open position illustrated in FIG. 1 to a closed position in which the two mold halves 10 and 11 enclose the inflation mandrel 12. Preferably, the two movable supports 14 and 16 are powered by actuators such as pneumatic actuators (not illustrated) for movement along the guide 17 between the opened and closed position.

The two mold halves are similar in structure and each include a support channel 18 mounted on the associated movable support 14 or 16. Positioned within each support channel are a plurality of similar corrugation forming sections 19 and end forming sections 21 and 22. In the illustrated mold structure, provision is provided for changing the effective length of the mold to permit manufacture of tubes having different numbers of corrugations. For this reason, corrugation forming sections 19 are provided on the outside of the two end forming sections 21 and 22 as well as therebetween. The manner in which the mold length can be changed is discussed in detail below.

The mandrel 12 includes a hollow tube or rod 23 which is closed at its outer end 24 and is connected to a source of compressed air (not illustrated) at its other end. A pair of rubber sleeves 26 and 27 are secured to the tube 23 at spaced locations adjacent to the associated end forming sections 21 and 22.

FIGS. 2 through 4 progressively illustrate the operation of forming an intermediate tube within the mold. In this instance, the intermediate tube is formed with one end portion having a relatively large diameter and the other end portion having a relatively small diameter. FIG. 2 illustrates the mold after an initial tube 31 of uncured elastomeric material is positioned around the mandrel 12 and the mold is closed, but before inflation of the tube by the inflatable mandrel.

Each of the corrugation forming sections 19 is formed with a semiconical inner mold surface so that when the two mold halves 10 and 11 are closed, they cooperate to define shallow extended corrugations extending outward from the inner extremities 32 to outer extremities 33. In the illustrated embodiment, each section 19 is formed with opposed semiconical surfaces 34 and 36 which extend at about 45° with respect to the axis from the inner extremity 32 and join with the associated surface of the adjacent section 19 at the outer extremity 33. The number of sections 19 located between the two end forming portions 21 and 22 is selected to provide the required number of corrugations in the finished tube. The two end forming sections 21 of the two mold halves 10 and 11 are shaped to provide a generally cylindrical inner surface 37 extending from the outer extremity of the conical surface 34 of the adjacent sections 19. The surface 37 is flared slightly as illustrated to facilitate subsequent manufacturing steps even though the end portion of the finished tube is normally desired to be substantially cylindrical. The end of the surface 37 opposite the adjacent section 19 is radiused at 38 to join with a radial wall 39 which extends to a cylindrical surface 41. The surface 41 is sized to closely fit the sleeve 26 with some clearance.

The two end sections 22 cooperate to form a cylindrical wall 42 which extends to a conical wall 43 proportioned to mate with the conical surface 36 of the adjacent section 19 at its outer extremity 31. The other end of the surface 42 joins with a conical wall 44 which extends inward to a cylindrical wall 46. Here again, the cylindrical wall 46 is proportioned to closely fit the sleeve 27 with clearance. The various mold elements and the initial tube 31 are proportioned so that the inner surface 47 of the tube loosely fits over the two sleeves 26 and 27 of the mandrel and so that the outer surface 50 of the tube is loosely received within the two mold halves.

In order to mount the two sleeves 26 and 27 on the tube 23, the tube is formed with spaced shallow annular recesses or grooves 48 with two spaced grooves provided for each sleeve. Each sleeve is secured to the associated two grooves by wrapping wire 49 around the sleeve so that the sleeve is tightly pressed down into the groove. The wire functions both to anchor the sleeves in the grooves and provide a fluid-tight joint between the sleeves and the tube. A layer of adhesive-type tape 51 is preferably wound around the sleeve over the wire 49 to provide a smooth exterior surface.

The interior of the tube 23 is connected to the chamber provided at the interface between the exterior of the tube and the sleeves between the associated recesses 48 by ports so that when air pressure is supplied to the interior of the tube 23, the sleeves are deformed radially outward in the zone between the recesses 48. In the illustrated embodiment, four ports 52 are provided for each sleeve and the diameter of the ports is about 3/16 of an inch. As discussed in greater detail below, the sleeves function initially to deform the ends of the initial tube 31 radially outward into tight engagement with the associated mold surfaces and to provide a fluid-tight seal between the tube inner surface at its ends and the sleeves. Subsequently, air pressure is supplied to the interior of the initial tube intermediate its ends. A pair of small ports 53 are provided for this purpose. In the illustrated embodiment, two ports 53 having a diameter of about 0.030 inches are provided for this purpose.

During the operation of the apparatus, the sleeves 26 and 27 sometimes rupture after a period of use. Therefore, the sleeves 26 and 27 are preferably provided which have a length which is several times the length of the spacing between the associated grooves 48. In the drawings, the length of the two sleeves is not illustrated as long as provided in actual practice because of drawing space limitation. The purpose of utilizing long sleeves is to facilitate the repair of the sleeves when a rupture occurs. For example, if a rupture occurs in the sleeve 26, the tape 51 is removed and the wires 49 are cut out. The left end of the sleeve is then cut away to remove the ruptured section without removing the sleeve from the tube. The sleeve is then moved down so that a new section of sleeve is positioned over the recesses. The wires are then replaced along with the tape to complete the repair. This is particularly desirable on the inboard sleeve 26 since it eliminates the necessity of pulling the sleeve over the outboard sleeve 27.

FIGS. 3 and 4 progressively illustrate the operation of forming an intermediate tube from the initial tube 31. When air under pressure is supplied to the mandrel, the two sleeves 26 and 27 are inflated and cause the deformation of the ends of the tube 31 to the position of FIG. 3 in which the tube ends firmly engage the surfaces 37 and 42. This occurs before any appreciable pressure is developed in the interior of the intermediate portion of the tube, because the ports 52 provide far greater flow capacity than the ports 53. After the two sleeves are fully inflated, the pressure within the tube intermediate the sleeves builds up and the central section of the tube is deformed into full seating engagement with the intermediate corrugation forming sections 19 as illustrated in FIG. 4. This completes the forming operation of the intermediate tube 54. This sequential operation of inflation in which the sleeves inflate before the interior of the tube is provided by proper selection of port sizes and eliminates the necessity of separate sequencing valves or the like.

After the intermediate tube 54 is formed, the air pressure is released from the mandrel and the sleeves return to the deflated position of FIG. 2. However, because the intermediate tube is formed of plastically deformable material, it retains the shape illustrated in FIG. 4. The two mold halves are then separated to the position of FIG. 1 and the intermediate tube 54 is removed by endwise movement from the inflatable mandrel. Since the maximum diameter of the mandrel is less than the minimum diameter of the intermediate tube, such removal of the intermediate tube occurs without any appreciable deformation or distortion of the intermediate tube. Consequently, its shape is uniformly maintained.

After removal of the intermediate tube 54 from the inflatable mandrel 12, it has a shape best illustrated in FIG. 5 in which the center portion is provided with shallow extended corrugations 56 and two generally cylindrical end portions 57 and 58. As mentioned previously, the end forming sections 21 are preferably formed so that the end portion 57 is flared slightly. The intermediate tube is then positioned on a curing mandrel 61 as illustrated in FIG. 6. The end portion 58 of the illustrated embodiment has an inner diameter substantially equal to the inner diameter of the corrugations 56 at their roots and the end portion 57 has an outer diameter slightly larger than the maximum diameter of the corrugations 56. The mandrel 61 has an outer surface diameter closely approaching the inner diameter of the end portion 58 and the inner diameter of the corrugations at their roots with sufficient clearance, provided to permit easy movement of the intermediate sleeve onto the mandrel.

As the intermediate tube is moved onto the mandrel the end portion 58 is moved into a collar 62 formed with a recess 63 proportioned to receive the end portion 58, and the tube is collapsed axially until the walls of the corrugation 56 are substantially radial as illustrated by the lower tube 64 on the mandrel 61. In the illustrated embodiment, this causes the radial extent of the corrugations to increase to a diameter substantially equal to the end portion 57. A second collar 66 is positioned on the mandrel and is provided with an outer surface 67 proportioned to slip into the end portion 57. Because the end portion 57 is initially flared slightly, insertion of the collar 66 is easily accomplished, and the collar functions to deform the end portion 57 to a generally cylindrical shape as illustrated in FIG. 6.

A second intermediate tube is then positioned on the mandrel 61 with a second collar 62 positioned against the first collar 66, and axially shortened in the same manner. The intermediate tube 54 illustrated at the upper end of FIG. 6 is illustrated prior to the shortening of the tube, but it should be understood that its length is subsequently reduced in the same manner as the lower tube 64. In this manner, two or more intermediate tubes can be positioned on a given mandrel and their length shortened to the final length required.

Means (not illustrated) are provided to lock the upper-most collar 66 on the mandrel 61 so that the tubes positioned on the mandrel are held at the desired length during the curing operation. Preferably, the mandrel 61 is a hollow tube and is provided with spaced ports 67 to insure that the interior of the tubes are maintained at the same pressure as the exterior of the tube during the curing operation. This prevents the tubes from being pressed inwardly against the mandrels and facilitates easy removal of the cured tubes from the mandrel after the curing is completed.

The method and apparatus incorporating the present invention produces substantial savings in manufacturing costs of corrugated tubing. For example, because no curing occurs in the initial molding operation, the cycle time is short and the pressurization to form the intermediate tube can be in the order of seven seconds. On the other hand, a very low cost curing mandrel structure is utilized in the manufacturing process during the curing of the material which normally takes considerably longer periods of time. Further, product uniformity is greatly increased due to the fact that it is not necessary to deform or distort the intermediate tube in any way to remove it from the mold apparatus and the shape of the intermediate tube is precisely controlled by the shape of the mold.

Referring to FIGS. 7 and 8, the illustrated mold structure can be modified easily when a change is required. In a given mold half, there are a relatively large number of corrugation forming elements 19 and two end forming elements 21 and 22. The corrugation forming elements are preferably formed with two holes 71 and 72 through which a pair of tie rods 73 and 74 extend. The two end forming sections 21 and 22 are also formed with grooves or slots 76 and 77 which are aligned with the holes 71 and 72 and receive the tie rods 73 and 74. The slots are used in the instance of the end forming sections 21 and 22 instead of the holes to facilitate removal and replacement of end sections. On the other hand, the corrugation forming sections are normally not removed from the rods, so holes are used in such sections.

Nuts 78 are threaded onto the ends of the tie rods 73 and 74 to clamp the mold assembly together. When the number of corrugations required for a particular tube differs from the number of corrugations in the tubes previously manufactured, the mold is converted easily by loosening set screws 79 which retain the mold assembly within the support channel 18 permitting removal of the mold sections and the rods. The nuts 78 are then loosened so that one or both of the end forming sections 21 or 22 can be removed as illustrated in FIG. 7. Appropriate numbers of mold sections 19 are then moved to the left or the right until the desired number of corrugation forming sections are located intermediate the spaces for the end forming sections. The end forming sections are then reinserted and the nuts 78 are tightened.

To complete the assembly, the mold sections are secured together by the tie rods and are repositioned in the channel supports 18. The set screws 79 are then tightened to secure the mold sections in the channels. Because the end forming sections 21 and 22 are formed with slots, they can be removed without completely disassembling the ends of the assembly. In the illustrated embodiment, the slots 76 and 77 are inclined at an angle of about 15° so that they cannot be removed from the bolts unless the mold sections are first removed from the channels. Consequently, if the nuts 78 are accidently loosened or become loose during the operation of the machine, the end forming sections cannot drop out and cause damage. However, they can be removed or replaced easily once the sections are removed from the support channels.

In some instances, the changeover requires the formation of a different type of end on the finished tube. In such case, the end sections 21 and 22 are removed and replaced by end sections having the required shape to form the desired tube. Here again, the removal is easily performed in the manner described above. Thus, it is possible to easily change the mold so that it will form a greater or lesser number of corrugations in the tube or to change the end forming sections permitting the formation of different types of ends on the final product. Consequently, it is not necessary to construct a single mold for each tube size or shape required. Further, the manufacture of the mold sections is considerably cheaper than the manufacture of an entire mold from a single piece of stock. Because the mold elements are only subjected to a compressive-type force, the mold sections can be formed of substantially any type of material so long as it provides sufficient compressive strength.

In some instances, it is desired to manufacture tubing having a cross section other than a circular cross section. For example, if an oval-type tubing is required, the intermediate tube 54 may be positioned on an oval shaped curing mandrel 81 as illustrated in FIG. 9. In positioning the tube on the oval mandrel, it is desirable to form the mandrel with a lead-on section which will facilitate the deformation from the circular shape to the oval shape 82 obtained by the mandrel. Once cured while being maintained in the oval shape, the material retains such shape and an oval cross section tube is produced. Of course, the collars or sleeves used in conjunction with the oval shape mandrel 81 must be similarly oval shaped to fit together.

With a method and apparatus in accordance with the present invention, the tooling costs are substantially reduced compared to the tooling costs required in most prior methods of manufacturing tubing of this type. Since the forming occurring in the mold is accomplished without any curing, the cycle time for the manufacture of parts within the mold is very short and relatively high production rates can be obtained with a single mold. On the other hand, the curing mandrels are simple tubes or pipes so that costs are low and sufficient numbers of curing mandrels can be provided to obtain relatively high production rates without excessive costs. Further, with a preferred apparatus in accordance with this invention, a single mold can be easily altered to form tubing of different types or of different lengths. Of course, when the length of the tube is changed by altering the mold, it is necessary in many instances to provide a different mandrel having the properly positioned sleeves to accommodate such length. However, the inflatable mandrel need not be changed merely because the type of end on the tube is changed since a given mandrel can be used to form large diameter ends as well as small diameter ends.

The method and apparatus for forming tubing in accordance with this invention also results in a reduction of scrap when compared to methods of manufacture which require the use of clamping bands at the ends of the initial tube to form a fluid-tight joint with a mandrel or mold. Such bands form an objectionable ridge which must be cut off in most instances. However, with the present invention utilizing an inflatable mandrel, such ridges are not produced and it is not necessary to trim the tube ends. Therefore, scrap is virtually eliminated.

Although preferred embodiments of this invention are illustrated, it is to be understood that various modifications and rearrangements of parts may be resorted to without departing from the scope of the invention disclosed and claimed herein.

What is claimed is:

1. An apparatus for forming corrugated tubing comprising a separable mold which can be opened and closed, said mold when closed providing an interior mold surface having spaced portions shaped to form the ends of such tube and an intermediate portion shaped to form extended corrugations, an inflation mandrel providing a radially expandable member enclosed within said mold when said mold is closed operable when pressurized to radially expand from its deflated position to radially deform an initial cylindrical tube of plastically deformable material into mating engagement with said mold thereby forming an uncured intermediate tube, said mold when opened and said mandrel is deflated permitting removal of said intermediate tube without substantial distortion.

2. An apparatus as set forth in claim 1 wherein said mold includes separate end forming sections which may be separately removed and replaced.

3. An apparatus as set forth in claim 1 wherein said mold includes a plurality of similar and separate corrugation forming sections cooperating to provide said intermediate portion.

4. An apparatus as set forth in claim 3 wherein said corrugation forming sections can be removed or inserted in said intermediate portion to change the number of corrugations formed in said intermediate tube.

5. An apparatus as set forth in claim 4 wherein said mold includes two separable assemblies each of which provides two separate end forming sections and a plurality of corrugation forming sections, and releasable mounting means to secure said assemblies together, release of said mounting means permitting changing of the number of corrugation forming sections between the associated end forming sections.

6. An apparatus as set forth in claim 5 wherein said assemblies each include corrugation forming sections on the side of at least one end forming section remote from said intermediate portion, and said one end forming section being removable to allow movement of selected corrugation forming sections into and out of said intermediate portion.

7. An apparatus as set forth in claim 1 wherein said inflation mandrel includes inflatable elastic means operable upon inflation to engage and laterally deform at least part of said initial tube into engagement with said mold.

8. An apparatus as set forth in claim 7 wherein said elastic means forms a fluid-tight joint with at least one end of said initial tube and allows pressurization of said initial tube.

9. An apparatus as set forth in claim 7 wherein said elastic means forms a fluid-tight joint with both ends of said initial tube and allows pressurization of the intermediate portion of said initial tube.

10. An apparatus as set forth in claim 8 wherein said mandrel includes flow control means operable to cause inflation of said elastic means before substantial pressurization of said initial tube.

11. An apparatus as set forth in claim 10 wherein said flow control means includes at least two flow restriction means having different resistances to flow.

12. An apparatus as set forth in claim 1 wherein said mandrel includes a hollow rod the interior of which can be pressurized and exhausted, an elastic sleeve around said rod cooperating therewith to form an expansible chamber, said rod being formed with first passage means connecting the interior of said rod with said chamber and second passage means connecting the interior of said rod with the interior of said initial tube, and said second passage means provides a greater restriction to flow than said first passage means.

13. An apparatus as set forth in claim 12 wherein similar sleeves are provided on said rod at spaced locations on either side of said second passage means.

14. An apparatus for forming corrugated tubing as set forth in claim 1 including a support proportioned to receive said intermediate tube in its final shape and support said tube during curing.

15. An apparatus for forming corrugated tubing comprising a separable mold providing an interior mold surface having spaced portions shaped to form the ends of such tube and intermediate portions shaped to form extended corrugations, means to inflate an intermediate tube of plastically deformable material into mating engagement with said mold, said mold including a plurality of similar and separate corrugation forming sections cooperating to provide said intermediate portions, and means releasably securing said sections together.

16. An apparatus as set forth in claim 15 wherein said corrugation forming sections are removable and replaceable in said intermediate portions to change the numbers of corrugations formed in a tube.

17. An apparatus as set forth in claim 16 wherein said mold includes at least two separable assemblies each of which provides two separate end forming sections and a plurality of corrugation forming sections, and mounting means for releasably clamping said sections together, said mounting means being releasable to permit the changing of the number of corrugation forming sections between the associated end forming sections.

18. An apparatus as set forth in claim 17 wherein said assemblies each include corrugation forming sections on the side of at least one end forming section remote from said intermediate portion and said one end forming section is removable to allow movement of selected corrugation forming sections into and out of said intermediate portion.

19. An apparatus as set forth in claim 15 wherein removable end forming sections provide said spaced portions.

* * * * *